United States Patent [19]

McCabe et al.

[11] Patent Number: 4,815,213

[45] Date of Patent: Mar. 28, 1989

[54] APPARATUS FOR TEMPERATURE COMPENSATION OF SENSING MEANS OF A MACHINE

[75] Inventors: William J. McCabe, North Kingstown; Vitaly I. Pesikov, Providence, both of R.I.

[73] Assignee: Brown & Sharpe Manufacturing Co., No. Kingstown, R.I.

[21] Appl. No.: 107,014

[22] Filed: Oct. 9, 1987

[51] Int. Cl.⁴ .............................................. G01C 15/06
[52] U.S. Cl. .................................. 33/125 T; 33/1 M; 33/503
[58] Field of Search ...................... 33/503, 125 T, 1 M

[56] References Cited

U.S. PATENT DOCUMENTS

| 2,664,787 | 1/1954 | Plimmer | 33/125 T |
| 3,045,510 | 7/1962 | Brainard | 33/125 T X |
| 3,212,194 | 10/1965 | Brault | 33/125 T X |

FOREIGN PATENT DOCUMENTS

| 3316081 | 11/1984 | Fed. Rep. of Germany | 33/125 T |
| 591692 | 2/1978 | U.S.S.R. | 33/125 T |
| 1050061 | 12/1966 | United Kingdom | 33/125 T |

Primary Examiner—William D. Martin, Jr.
Attorney, Agent, or Firm—Wolf, Greenfield & Sacks

[57] ABSTRACT

In a coordinate measuring machine, apparatus for compensating the sensing means for determining the position of a probe for changes in temperature, where the machine base and the support column for the probe have differing coefficients of thermal expansion. In a preferred embodiment, the apparatus of this invention is used to prevent "zero shift" in the Z-direction for a Z-rail. The compensating apparatus is associated either with the support column or Z-rail. The apparatus offsets the greater expansion of the machine component having the greater coefficient of thermal expansion. Typically, the position sensing means for the Z-rail includes an encoder and a scale. In one embodiment, either the encoder or the scale is secured to a mount which is affixed to the column. One element of the mount which extends upwardly from the support column has a coefficient of thermal expansion which is substantially less than that of the aluminum of which the column is composed. In another embodiment of this invention, the encoder the scale is secured to a lower end of a rod depending downwardly from the support column. In this alternative embodiment, the rod is composed of a material having a coefficient of thermal expansion substantially greater than that of the component of the support column, which is especially aluminum. In a third embodiment, two supports can be used, one having a coefficient of thermal expansion substantially greater than aluminum and another having a coefficient of thermal expansion substantially less than aluminum. Similar apparatus also is used to prevent "zero shift" in the X and Y directions.

18 Claims, 4 Drawing Sheets

U.S. Patent  Mar. 28, 1989  Sheet 1 of 4  4,815,213
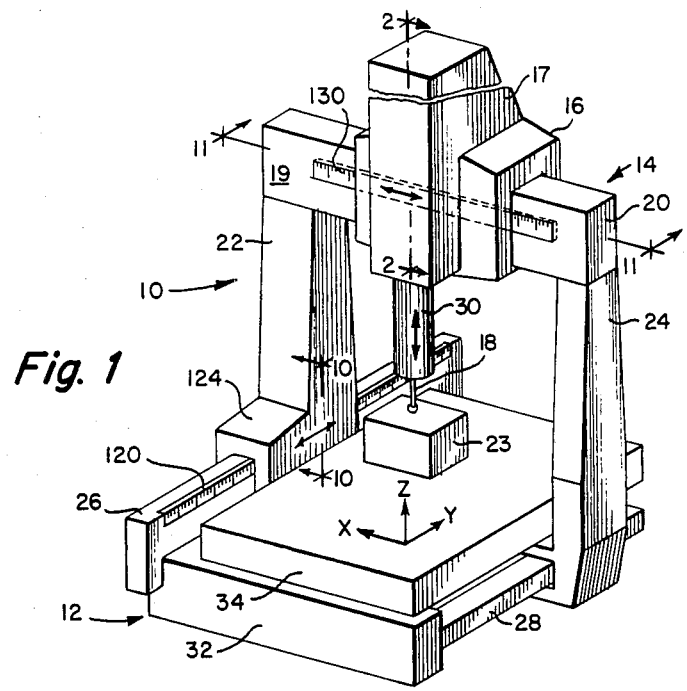
Fig. 1
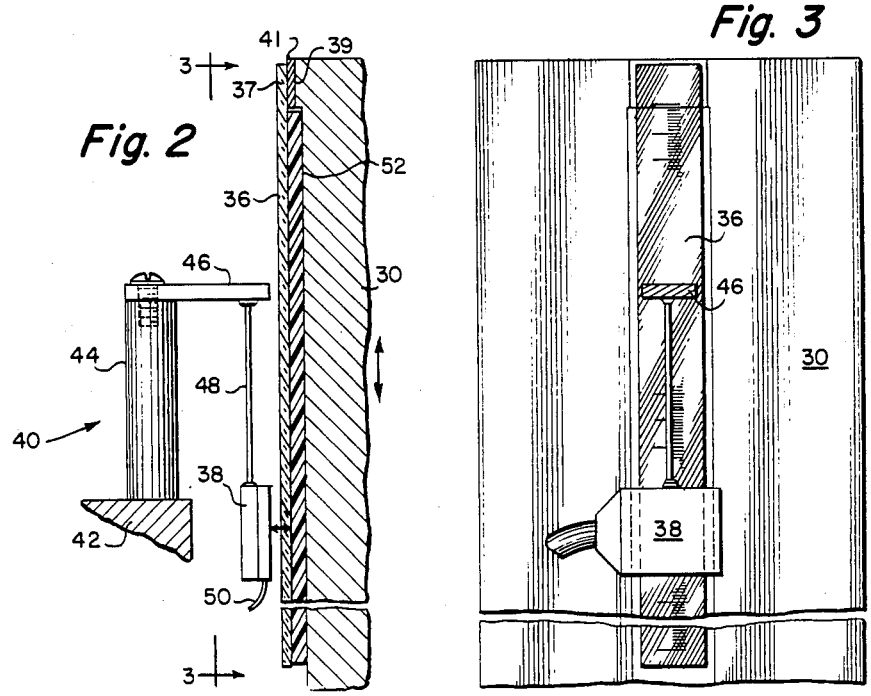
Fig. 2
Fig. 3

APPARATUS FOR TEMPERATURE COMPENSATION OF SENSING MEANS OF A MACHINE

FIELD OF THE INVENTION

This invention relates generally to apparatus for compensating for temperature variations in a coordinate measuring machine, and more particularly, to apparatus for offsetting the differences in the coefficients of thermal expansion of different parts of the machine structure.

BACKGROUND OF THE INVENTION

Coordinate measuring machines frequently are used for the dimensional inspection of workpieces, such as machine parts. A workpiece is secured to a table, and a measuring probe is secured to a movable ram. In order to measure the position of a point on a workpiece, the probe is brought into contact with the point, and the X, Y, and Z measuring scales of the machine are read. Typically, the probe is attached to a vertically movable Z-rail which is also movable in a horizontal plane. Thus, the probe can be moved in three dimensions for contact with a workpiece which is being measured. Typically, the X, Y and Z axis coordinates are each measured using an associated scale and an encoder with a reticle. Either the encoder or the scale can be mounted directly upon the associated rail, while the other of the encoder and scale is mounted to an adjacent support.

Many prior art coordinate measuring machines are designed to be used in controlled, constant temperature environments, so that once calibrated at that temperature, temperature induced errors are not a concern. However, it is not always possible to use these machines in controlled environment conditions, since their use is severely restricted. Where coordinate measuring machines are designed to be used in non-controlled environments with differing temperatures, if the machine is calibrated for use in one temperature environment, use thereof in a different temperature environment may induce uncontrolled errors into the measurement. Errors in the Z-corrdinate readings are most common. The significance of the errors is proportional to the change in temperature. These errors in Z-coordinate readings result from the different materials which may be used to fabricate each of the work support, the probe, and the Z-rail support. Because of the different materials, each of these components may have a different coefficient of thermal expansion, so that a temperature variation can produce differing amounts of expansion in each of these components. As a consequence, such temperature vairations cause a shift to occur in the Z-coordinate reading when the probe is in contact with the work support (i.e., the origin), a phenomenon known as "zero shift." Such a shift in the origin induces corresponding errors into all Z-coordinate measurement when only one point on a workpiece, or one end of a distance to be measured, is determined at any one time. Where an encoder and scale are used, this shift is produced by movement of the scale and encoder with respect to one another.

Correcting for "zero shift" is very difficult especially where the temperature continually changes. The origin of the part must be continually reestablished for each temperature change either mechanically or automatically by a microprocessor controlled system. However, these solutions could result in unnecessarily large delays, and may not readily permit compensation for changes in temperature which occur during the actual measuring process.

It is desirable to provide a coordinate measuring machine which can be used at any temperature within a range of normal temperature environments without requiring continual reestablishment of the origin. It is also desirable to provide a coordinate measuring machine which automatically compensates itself for any temperature variations which occur during a measurement process. It is also desirable to provide a coordinate measuring machine which provides Z-coordinate measurements which are accurate to a high degree of certainty, regardless of the ambient temperature.

It is a general object of the present invention to provide a coordinate measuring machine which can provide highly accurate readings, regardless of the ambient temperature.

It is another object of the present invention to provide a coordinate measuring machine which can provide highly accurate Z-coordinate measurements regardless of the ambient temperature.

It is a further object of the present invention to provide a coordinate measuring machine which automatically compensates for changes in the ambient temperature.

It is yet another further object of the present invention to provide apparatus to compensate for temperature induced shifts in the reference surface of a coordinate measuring machine with respect to the measurement system.

It is a further specific object of the present invention to provide apparatus for offsetting the results of differences in the coefficients of thermal expansion of different parts of a coordinate measuring machine upon which an encoder and scale are mounted for Z-coordinate measurements.

SUMMARY OF THE INVENTION

In accordance with the above and other objects, this invention relates generally to apparatus for automatically compensating for variations in the ambient temperature to avoid "zero shift" in a coordinate measuring machine in which different components of the machine structure are formed of materials having different coefficients of thermal expansion. These and other objects and advantages are achieved by the use in conjunction with the measuring scales of the coordinate axes to be read, including the Z-axis, of a mount in the machine structure which has a coefficient of thermal expansion which is either much greater than or much less than that of the material of the components forming the structure so that the expansion and contraction of different components of the machine structure is equalized over a range of temperatures. Such a structure avoids "zero shift" in the axis to be measured. The exact nature of the mount, the length of the mount, and the material from which the mount is formed are functions of the particular structure of the coordinate measuring machine with which it is to be used.

In a preferred embodiment, Z-coordinate measurements of a Z-rail are made using an encoder in conjunction with a reticle and a scale. Either the encoder or the scale may be secured directly to the Z-rail, while the other of the two is mounted on the bridge structure, and in particular the housing, which supports the Z-rail. Typically, the scale is mounted directly to the Z-rail, while the encoder is mounted on the bridge structure. The mount may be used in conjunction with either the scale or the encoder. The mount of this invention compensates for the differences in the coefficients of thermal expansion for the aluminum bridge structure on one hand, and the granite base steel components and various other parts on the other hand. The steel components include various portions of the base support, the support wire for the encoder, the probe, and the air bearing components. In one embodiment, the mount is composed of a material having a coefficient of thermal expansion, such as an invar, which is much lower than that of the aluminum bridge structure. The invar mount can be used either with the encoder on the bridge structure or with the scale on the Z-rail, or with the encoder on the Z-rail, or with the scale on the bridge structure. The precise height or length of the mount can be determined from the height and coefficient of thermal expansion of the bridge structure associated with the encoder and from the coefficients of thermal expansion of each component of the machine associated with the scale, including the Z-rail, the probe, the granite base and other steel components listed above.

In an another embodiment of the invention, a material having a coefficient of thermal expansion much greater than that of aluminum is used for the mount, such as a zinc alloy. In this embodiment, the mount depends downwardly from the bridge structure with the encoder suspended from a lower end. Finally, in a third embodiment, both a material having a higher coefficient of thermal expansion and one having a lower coefficient of thermal expansion are used. This embodiment results in a more compact construction. The mount is affixed to the bridge structure and has two arms, one with the lower coefficient affixed directly to the carriage on the bridge and one with the higher coefficient coupled to the lower coefficient arm and supporting the encoder from a lower, distal end.

The same concepts can also be used to prevent "zero shift" with respect to the associated encoder and scales used to determine the X and Y axis coordinates.

The coordinate measuring machine of this invention is automatically compensated for temperature variations, so that the X, Y and Z coordinate readings are always highly accurate at the table level at temperatures in the range of from about 0° C. to about 40° C., regardless of the temperature at which the measurement was made. The origin need not be reestablished for any changes in temperature either before or during the measurement process.

DESCRIPTION OF THE DRAWINGS

The objects, advantages and features of this invention will be more clearly appreciated from the following detailed description when taken in conjunction with the accompanying drawing in which:

FIG. 1 is a pictorial, perspective view showing a coordinate measuring machine utilizing the present invention;

FIG. 2 is a partial cross-sectional view of a coordinate measuring machine of this invention taken along the lines 2—2 of FIG. 1;

FIG. 3 is a front elevational view of the scale and encoder of this invention taken in the direction 3—3 of FIG. 2;

DETAILED DESCRIPTION OF THE PREFERRED EMBODIMENTS

Figure 4:
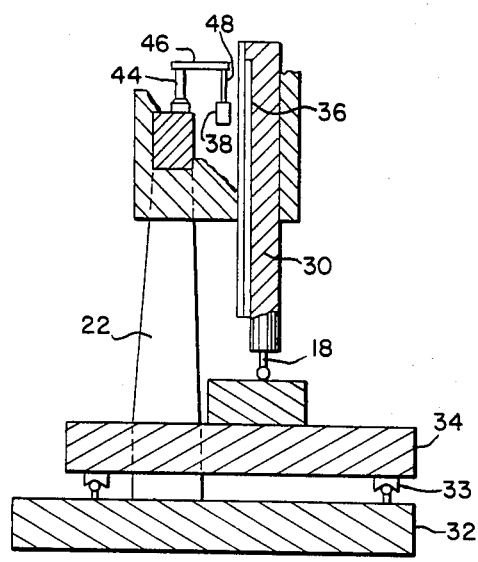
FIG. 4 is a cross-sectional schematic side view of the coordinate measuring machine of FIG. 1 showing one embodiment of this invention.

With reference now to the drawing, and more particularly to FIGS. 1—3 thereof, the coordinate measuring machine incorporating the temperature compensation mount of the present invention will be described. Machine 10 includes a base assembly 12, a bridge 14 and a carriage 16. The carriage 16 is movable horizontally, or in an X direction, along guideways on an X-rail 20. The X-rail 20 is carried by vertical support members 22 and 24 which together with the X-rail 20 form bridge 14 which is movable in the Y direction along Y-rails 26 and 28 which are mounted on base assembly 12. A Z-rail 30 is supported on carriage 16 and moves vertically, or in the Z-direction, through bearings in carriage 16 on a front side 19 of bridge 14. Typically, a counter balance (not shown) supports the weight of Z-rail 30 and allows free vertical movement thereof. Z-rail 30 carries a probe 18 on its lower, distal end. Probe 18 may be brought into contact with points on the surface of a workpiece 23 to permit measurements of the coordinates of those points by the machine. In a preferred embodiment, base assembly 12 includes a lower support base 32 which carries Y-rails 26 and 28 and a granite block 34 which is mounted on support base 32 in thermal isolation therewith. The entire machine is supported by feet 33 (FIG. 4) attached to the underside of support base 32.

A scale is associated with each direction of movement for determining the coordinates of selected points on the workpiece. Scale 36 is associated with the Z-direction of movement, scale 120 is associated with the Y-direction of movement, and scale 130 is associated with the X-direction of movement. The readings on each scale are subject to errors arising from various sources, including machine distortions which are caused by different elements of the machine having different coefficients of thermal expansion, causing these different elements to expand or contract at different rates and by different amounts as a result of temperature variations. One particular source of error is found in the measurement of the Z-coordinate by measuring the displacement of Z-rail 30 with respect to X-rail 20 of carriage 16.

For example, in a typical coordinate measuring machine as shown in FIG. 1, support members 22 and 24, rails 20, 26, 28 and 30, lower base 32, and probe 18 are formed of different materials which have different coefficients of thermal expansion. Support members 22 and 24, X-rail 20, Y-rails 26 and 28, support base 32, and Z-rail 30 all are typically formed of aluminum. This aluminum has a coefficient of thermal expansion typically of about $13 \times 10^{-6}$ inches per inch per degree Fahrenheit. Probe 18 is typically formed of steel, having a coefficient of thermal expansion of about $8.3 \times 10^{-6}$ inches per inch per degree Fahrenheit. Base 34 typically is formed of granite which has a coefficient of thermal expansion of about $3.7 \times 10^{-6}$ inches per inch per degree Fahrenheit. A mismatch in the coefficient of thermal expansion occurs in the materials associated with the components of the machine supporting the Z-coordinate measuring apparatus and the components of the machine associated with the actual measurement of the Z-coordinate. As a consequence, for a given temperature change, if probe 18 is resting on base 34 a shift occurs in the Z-scale reading which is known as "zero shift" and if it is not properly compensated for, errors are induced in all Z-coordinate measurements. This problem is particularly acute in the Z-axis, because of the existence of several different materials which comprise the coordinate measuring machine in the vertical or Z-direction. This problem is not so great in the X or Y directions, because in those directions all of the elements of this particular machine are of uniform composition. Since little or no differential expansion occurs, temperature induced errors are minimized.

Typical apparatus for measuring the Z-coordinate in a coordinate measuring machine is shown in FIGS. 2, 3 and 4. Z-rail 30 carries a scale 36 mounted onto an outside surface thereof. Directly opposite scale 36 in spaced, confronting relation therewith, is an encoder 38 which is supported by a mount 40 affixed to a support 42 secured to carriage 16. Although in FIGS. 2, 3 and 4, scale 36 is shown mounted onto Z-rail 30 and encoder 38 is shown mounted onto carriage 16, the positions of these two elements could be reversed, and scale 36 could be fixedly mounted with regard to carriage 16, while encoder 38 could be secured to Z-rail 30. In the embodiment shown in FIGS. 2, 3 and 4, scale 36 is disposed on a side of Z-rail 30 facing the front side 19 of bridge 14. Mount 40 is in turn secured to an interior surface of housing 17. However, scale 36 and encoder 38 also can be aligned on either the left or right side of Z-rail 30 as seen facing the front side 19 of bridge 14 in FIG. 1, or on the side of Z-rail 30 facing away from front side 19 of bridge 14. A wire 50 extends from encoder 38 to conventional microprocessor circuitry. Typically scale 36 is a glass scale, and encoder 38 is a reflective encoder with a reticle.

In a preferred embodiment, mount 40, as shown in FIGS. 2 and 3, typically includes column 44, arm 46 extending laterally outwardly from column 44, and a rod 48 depending downwardly from arm 46. Encoder 38 is secured to the lower or distal end of rod 48. Column 44 is composed of a material which has a coefficient of thermal expansion which is much lower than that of aluminum at or about room temperature, namely, 20° C. In the configuration of FIGS. 2–4, as shown schematically in FIG. 5, the primary constituent of the component of the machine supporting Z-rail 30, namely members 22 and 24, X-rail 20 and Y-rails 26 and 28, is aluminum. The primary constituants of the Z-coordinate measuring component of the machine, namely, block 34, probe 18, and Z-rail 30, are granite, steel and aluminum respectively. Since the coefficient of thermal expansion of aluminum is greater than that of each of steel and granite, column 44 on carriage 18 is necessary to offset the greater rate and amount of expansion of the component supporting Z-rail 30. Arm 46 can be composed of any material having adequate strength and rigidity, and is typically composed of steel. Rod 48 is also typically composed of steel.

Scale 36 is secured to Z-rail 30. The upper end 37 of scale 36 is affixed directly to a surface 39 of Z-rail 30 by rigid glue 41. Preferably, the lower portion thereof is mounted onto a foam backing material 52 which in turn is mounted onto Z-rail 30. Material 52 helps thermally isolate scale 36 from Z-rail 30 and to allow somewhat independent expansion and contraction of scale 36. Scale 36 expands and contracts from its point of attachment to Z-rail 30 at its upper end. In a preferred embodiment, the material 52 is chosen so that scale 36 expands and contracts at the same rate as the workpiece. If the workpiece is formed of steel, scale 36 may be formed of glass and material 52 may be an closed cell polyethylene foam using an acrylic adhesive. The foam thickness is selected to provide scale 36 with the same rate of expansion as the steel workpiece. In this manner, the effects of temperature variations on the workpiece are automatically compensated for.

Figure 5:
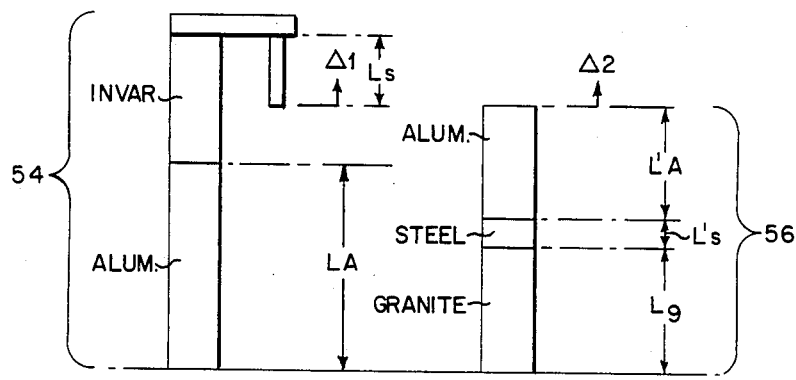
FIG. 5 is a schematic representation of the Z-rail assembly, and the Z-rail support assembly of FIG. 4.

The length, or vertical height, of column 44 is a function of several variables, and must be determined with respect to each particular coordinate measuring machine with which this invention is to be used. The calculation of this length for column 44 will now be described with regard to FIGS. 4 and 5 which graphically illustrate the concepts involved. FIG. 5 illustrates the components of the vertical column 54 of the machine which support encoder 38. As can be seen, column 54 includes Y-rail 26, support member 22, X-rail 20, column 44, and rod 48. Y-rail 26, support member 22, and X-rail 20 are all composed of aluminum and are shown in FIG. 5 as the aluminum component of column 54. Column 44 is composed of a material having a coefficient of thermal expansion substantially less than that of aluminum, and is shown as another component of column 54. Steel rod 48 expands or contracts in a direction opposite that of column 44, since it depends from arm 46, and rod 48 is offset with regard to the other elements of column 54. Scale 36 is supported by column 56 of FIG. 5. Column 56 includes block 34, probe 18 and Z-rail 30. Block 34 typically is composed of granite, probe 18 typically is composed of steel, while Z-rail 30 is composed of aluminum.

The length of column 44 may be calculated as shown below. Since it is desirable that there be no relative shift in position of the encoder 38 with regard to scale 36 when Z-rail 30 is in its zero position with the probe resting on block 34, the total change in the height of column 54 should equal the total change in the height of column 56 for a given temperature change $\Delta t$. Therefore, the change in the height of column 54, represented by $\Delta_{54}$ can be determined from the following equation:

$$\Delta_{54} = L_A \alpha_A \Delta t + L_{44} \alpha_{44} \Delta - L_S \alpha_S \Delta t$$

where the coefficient of thermal expansion for column 44 is $\alpha_{44}$ and $L_A$ equals the length of the aluminum component of column 54, while $L_S$ equals the length of the steel component of column 54, and $\alpha_A$, $\alpha_S$ and $\alpha_{44}$ represent the coefficients of thermal expansion for aluminum, steel, and column 44 respectively. Similarly, for column 56, $\Delta_{56}$ can be determined as follows:

$$\Delta_{56} = L_g \alpha_g \Delta t + L'_S \alpha_S \Delta t = + L'_A \alpha_A \Delta t$$

where $L_g$ represents the height of the granite component of column 56, and alpha$_g$ represents the coefficient of thermal expansion for granite. The prime superscript represents the lengths for aluminum and steel for column 56. Since the change in heights of the two columns must be equal for no "zero shift", $\Delta_{54}$ equals $\Delta_{56}$ and the following must be true:

$$L_A\alpha_A + L_{44}\alpha_{44} - L_S\alpha_S = L_g\alpha_g + L'_S\alpha_S + L'_A\alpha_A$$

This equation can be solved for the length of column 44.

In a preferred embodiment, column 44 of FIGS. 2-4 is formed from an invar alloy. A preferred alloy is Invar-36 which can be purchased from Carpenter Technology Corp. The preferred invar alloy has a coefficient of thermal expansion of $0.7 \times 10^{-6}$ inches/inch/degree F. Another acceptable material for column 44 is a silica glass material sold under the trademark ZERODUR which can be purchased from Schott Optical Glass Company. ZERODUR has a coefficient of thermal expansion of $0.2 \times 10^{-6}$ inches/inch/degree F. Another acceptable material for column 44 is silica glass which has a coefficient of thermal expansion of about $0.3 \times 10^{-6}$ inches/inch/degree F. Graphite is also an acceptable material for column 44, and it has a coefficient of thermal expansion of about $0.06 \times 10^{-6}$ inches/inch/degree F. Another suitable component for column 44 is an alumina ceramic which has a coefficient of thermal expansion of $4.3 \times 10^{-6}$ inches/inch/degree F. All of the foregoing coefficients of thermal expansion are measured at a temperature of about 20° C.

In one example of a coordinate measuring machine of FIG. 1, the Z-rail 30 has a length of about 630 mm from probe 18 to encoder 38. The length of probe 18 (including the ball) is about 3 inches, and the diameter of the ball on the end of probe 18 is about ½ inch. The thickness of granite block 34 is three inches. For such a machine, column 44 has the following empirically determined lengths for the respective materials: Invar-36-80 mm; ZERODUR-76.6 mm; silica gel-77.3 mm; graphite-75.7 mm; and alumina ceramic-117.4 mm.

Figure 6:
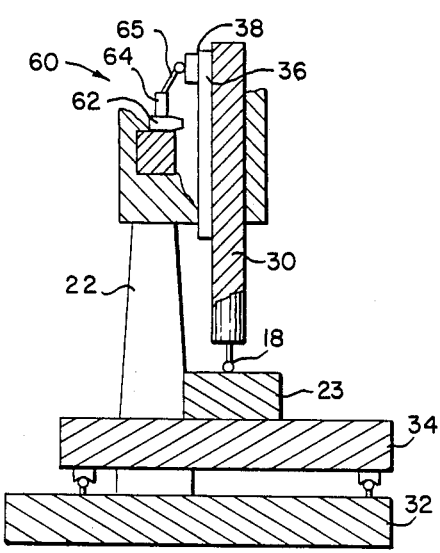
FIG. 6 is a cross-sectional schematic side view of the coordinate measuring machine of FIG. 1 showing an alternative embodiment of this invention.
Figure 7:
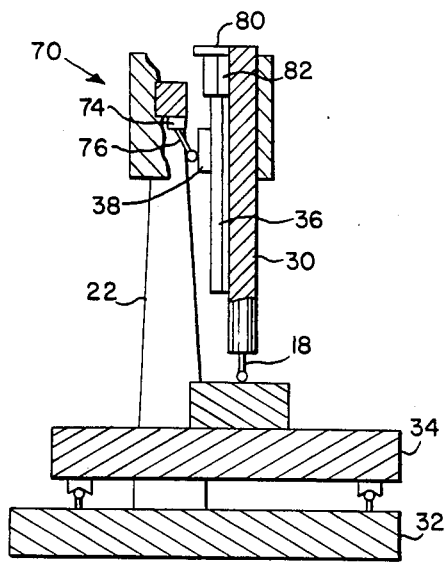
FIG. 7 is a cross-sectional schematic side view of the coordinate measuring machine of FIG. 1 showing a third embodiment of this invention.

Alternative configurations of mount 40 which is composed of a material having a coefficient of thermal expansion which is substantially less than that of aluminum, are shown in FIGS. 6 and 7. Like numbers are used for like parts where appropriate. Other than where indicated, all of the components shown in FIGS. 6 and 7 are identical to those shown in FIGS. 1-5. With regard to FIG. 6, mount 60 includes a generally horizontally extending arm 62 which is secured to support 42 of housing 17 of carrige 16. Arm 62 can be composed of any suitably strong material, such as steel. Extending upwardly from arm 62 is a column 64 composed of a material having coefficient of thermal expansion which is substantially less than that of aluminum. Extending upwardly from column 64 is a rod 65 formed of a strong, rigid material such as steel. Secured to the upper or distal end of rod 65 is encoder 38. Column 64 may be composed of the same materials as is column 44, and the length of column 64 can be determined in the same manner as is the length of column 44. In all other respects, the embodiment of FIG. 6 is identical to that of FIGS. 1-5.

Another embodiment using a material having a relatively low coefficient of thermal expansion is shown in FIG. 7. In this embodiment mount 70 includes a horizontally extending arm 74 and a vertical rod 76 depending from arm 74. Encoder 38 is secured to the lower end of rod 76. Arm 74 and rod 76 are each formed of a suitably strong material, such as steel. Z-rail 30 includes a generally horizontally extending shoulder 80, and a bracket 82 secured to the lower surface of shoulder 80. Bracket 82 is formed of a material which has a coefficient of thermal expansion substantially less than that of aluminum. Secured to a lower edge of bracket 82 is scale 36. In the embodiment shown in FIG. 7, the "zero shift" is corrected by coupling scale 36 to bracket 82 which causes scale 36 to move upwardly with respect to Z-rail 30 during periods of temperature increase to maintain in a fixed relation the relative positions of scale 36 and encoder 38. Bracket 82 can be formed of the same material as is column 44, and the length of bracket 82 can be calculated using the same considerations involved in a calculation of the length of column 44. Although scale 36 is provided with a foam backing 84, backing 84 permits scale 36 to move with respect to Z-rail 30. Conversely, during periods of temperature decrease, bracket 82 permits scale 36 to move downwardly with respect to Z-rail 30, again to maintain the desired fixed relation between scale 36 and encoder 38. In all other respects, the embodiment of FIG. 7 is identical to that of FIGS. 1-5.

Figure 8:
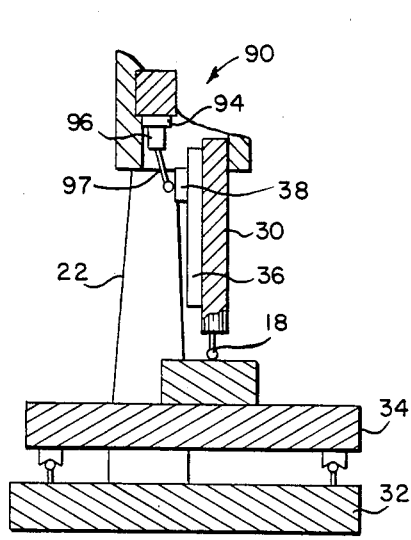
FIG. 8 is a cross-sectional schematic side view of the coordinate measuring machine of FIG. 1 showing a fourth embodiment of this invention.

An embodiment of the present invention utilizing a material having a coefficient of thermal expansion substantially greater than that of aluminum will now be described with respect to FIG. 8. Except for the configuration of the mount, the embodiment of FIG. 8 is identical in all other respects to FIGS. 1-5. Like numbers will be used for like parts where possible. Mount 90 of FIG. 8 includes a generally horizontally extending arm 94 and downwardly depending arms 96 and 97. Arm 96 extends downwardly from arm 94 and arm 97 depends from arm 96. Encoder 38 is secured to a lower or distal end of arm 97. Arm 97 is composed of a strong, rigid material such as steel. Arm 96 is composed of a material having a coefficient of thermal expansion substantially greater than that of aluminum. Arm 96 expands downwardly with an increase in temperature, and contracts upwardly with a decrease in temperature, thus offsetting the comparably greater vertical increase provided to encoder 38 by the generally all aluminum content of the component of the machine supporting encoder 38, when compared with the component of the machine measuring the Z-coordinate. As previously described, the component of the machine measuring the Z-coordinate includes a granite base and a steel probe, both of which have coefficients of thermal expansions less than that of aluminum. Conversely, during periods of temperature decrease, arm 96 contracts more rapidly than the generally all aluminum component of the machine supporting encoder 38, thus compensating for the greater contraction of that component than the component of the machine which measures the Z-coordinate. In this manner, the relative position of encoder 38 with respect to scale 36 is maintained in a generally fixed relation. In all other respects, the embodiment of FIG. 8 is identical to that of FIGS. 1-5.

Typical materials which may be used for arm 96 which have coefficients of thermal expansion substantially greater than that of aluminum include zinc alloys which typically have a coefficient of thermal expansion of $18 \times 10^{-6}$ inches/inch/degree F. Another example is a phenolics which typically have coefficients of thermal expansion of $23 \times 10^{-6}$ inches/inch/degree F. The necessary length for arm 96 may be calculated using the same considerations previously used for the determination of the length of column 44. The equation for the measuring component of the machine is identical to that previously set forth for column 56 of FIG. 5. The equation showing the change in length of the vertical component of the machine supporting encoder 38 are set forth as follows:

$$\Delta = L_A \alpha_A \Delta t - L_{96} \alpha_{96} \Delta t - L_S \alpha_S \Delta t$$

These equations can be solved for the length of arm 96, namely, $L_{96}$ by setting them equal to one another, as before. It has been found that for a coordinate measuring machine such as that previously described in which a length of the Z-rail from the top of probe 18 to encoder 38 is 630 mm, where the length of probe 18 is three inches, where the diameter of the ball of the end of probe 18 is ½ inch and where the thickness of the granite block is about 3 inches, arm 96 has the following lengths: zine alloys-150.7 mm; and phenolics-82.2 mm.

Figure 9:
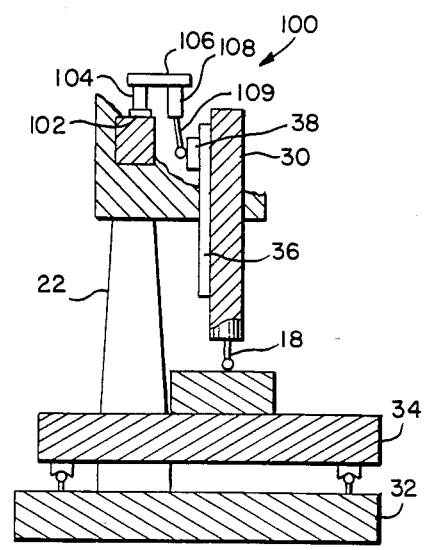
FIG. 9 is a cross-sectional schematic side view of the coordinate measuring machine of FIG. 1 showing a fifth embodiment of this invention.

Another embodiment of this invention is shown in FIG. 9. The embodiment of FIG. 9 illustrates the use of materials having both coefficients of thermal expansion substantially greatear than that of aluminum, and coefficients of thermal expansion substantially less than that of aluminum. Mount 100 includes an arm 102 extending from support 42 of housing 17 of carriage 16. Extending upwardly from arm 102 is a column 104. Extending generally horizontally from the top of column 104 is another arm 106, and depending downwardly from arm 106 in spaced relation with column 44 are rod 109 and another column 108. Secured to the lower or distal end of rod 109 is encoder 38. Rod 109 is composed of a strong, rigid material such as steel. In this embodiment, column 104 is composed of a material having a coefficient of thermal expansion substantially less than that of aluminum, and column 108 is composed of a material having a coefficient of thermal expansion substantially greater than that of aluminum. The change in length $\Delta_E$ for the component of the machine supporting encoder 38 may be found from the following equation:

$$\Delta_E = L_A \alpha_A \Delta t + L_{104} \alpha_{104} \Delta t - L_{108} \alpha_{108} \Delta t - L_S \alpha_S \Delta t$$

while the change in length for the Z-rail column ($\Delta_Z$) may be found from the following equation:

$$\Delta_Z = L_g \alpha_g \Delta t + L_S \alpha_S \Delta t + L\alpha'_A \alpha_A \Delta t$$

The subscripts 104, 108 represent columns 104 and 108 respectively. Setting the two equations equal to one another, by fixing either the length of column 104 or the length of column 108, the length of the other may be determined.

It should be understood that in all of the embodiments of FIGS. 1-9, the location of encoder 38 and scale 36 may be interchanged at any time, although it is preferred that scale 36 be secured to Z-rail 30, and that encoder 38 be associated with carriage 16.

While this invention has been described herein particularly in conjunction with Z axis measurements, this invention can also be used in conjunction with the X and Y axis measuring scales to prevent zero shift with respect to the scale and encoder used to measure the X and Y axis coordinates. This invention may be required where base 32 or block 34 is formed of different materials or is non-uniform in composition. Also, this invention may be required where block 34 does not expand about its center or when the points about which the block and the scales expand from are offset.

Figure 10:
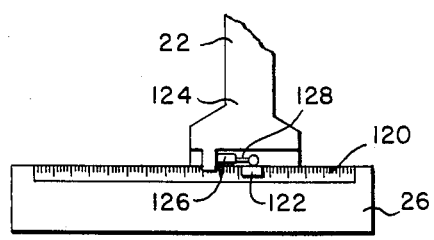
FIG. 10 is a partial cross-sectional view taken along the lines 10—10 of FIG. 1.

The use of this invention with regard to the Y axis will now be described with particular reference to FIGS. 1 and 10. As shown in FIG. 1, scale 120 is disposed on Y rail 26 in an indentation at the top of the rail. As shown in FIG. 10, encoder 122 is disposed in closely spaced, opposed relation with scale 120. Encoder 122 is mounted on the housing 124 of the base of support member 22. A column 126 is secured to housing 124. Extending from column 126 is a rod 128, and disposed on the end of rod 128 is encoder 122. Encoder 22 and scale 120 together provide an indication of the Y coordinate reading. As previously described for the Z coordinate, column 126 may be formed either of a material either having a coefficient of thermal expansion substantially greater than that of aluminum, or a material having a coefficient of thermal expansion substantially less than that of aluminum to compensate for zero shift of the encoder with respect to the scale. The same principles that apply to the embodiments of FIGS. 2-9 also apply herein, and the same types of equations may be used to determine the length of column 126. Column 126 may be formed of the same materials as is column 44, such as an invar alloy, or it may be composed of a material such as that comprising arm 96.

Figure 11:
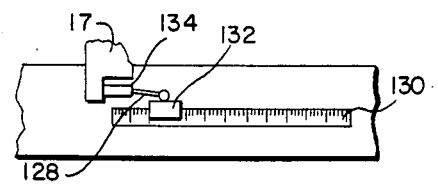
FIG. 11 is a partial cross-sectional view taken along the lines 11—11 of FIG. 1.

Similarly, the same concept can be applied in preventing zero shift along the X axis. This embodiment will now be described in particular reference to FIGS. 1 and 11. As shown in FIG. 1, the X axis scale 130 is disposed generally in the center of X-rail 20 in a recess thereof on side 19. An encoder 132 is disposed in closely spaced, confronting relationship with scale 130 to provide an indication of the X coordinate measurement of selected points on a workpiece. As shown in FIG. 11, the column 134 is mounted to a portion of housing 17, and extending from column 126 is a rod 128. Disposed on the end of the rod 128 is encoder 132. Column 134 may be formed either of a material having a coefficient of thermal expansion substantially greater than that of aluminum, or a material having a coefficient of thermal expansion which is substantially less than that of aluminum. As previously described, rod 128 is typically formed of steel. Column 134 can be either be formed of a material, such as invar, as is column 44, or it can be formed of the same material as is arm 96, such as a zinc alloy. The same configurations may be used for column 134, as previously described with respect to FIGS. 2-9, and the considerations used for the equations to determine the length of column 44 can be used to determine the length of column 134.

Using either a material having a coefficient of thermal expansion much greater than or much less than aluminum, errors in measurements of the Z-coordinate due to "zero shift" caused by temperature variations during the measuring process can be automatically eliminated in a simple but hightly effective manner, so long as the temperature is in the range of from about 0° C. to about 40° C. There is no need for continual measurements of temperature at various locations on the machine, and there is no need for complex software for automatically adjusting measured coordinates for temperature variations. Thus, the coordinate measuring machine can be used in a wide variety of normal operating temperatures in the range of from about 0° C. to about 40° C. without fear of temperature induced errors. Furthermore, because of the straightforwardness of this technique, the measurements are highly accurate.

In view of the above description, it is likely that modifications and improvements may occur to those skilled in the art within the scope of this invention. Thus, the above description is intended to be exemplary only, the scope of the invention described in the following claims and their equivalents.

What is claimed is:

1. A machine for measuring a selected coordinate of a point on a workpiece comprising:
    a machine base;
    a worktable for supporting the workpiece, said worktable having a first coefficient of thermal expansion and being mounted on said machine base;
    a probe movable in a prescribed direction relative to the workpiece for contacting a point on the workpiece whose coordinate is to be determined;
    means resting on said machine base for supporting said probe, said supporting means having a second coefficient of thermal expansion;
    means for sensing the position of said probe relative to said supporting means in a prescribed direction, said sensing means having an associated zero position; and
    fixed temperature compensation means associated with at least one of said probe and said supporting means for automatically equalizing the expansion and contraction of said worktable and said supporting means with temperature changes, said temperature compensation means comprising an element of selected length and of a selected coefficient of thermal expansion which is substantially different from the greater of said first and said second coefficients of thermal expansion.

2. A machine as defined in claim 1 wherein said temperature compensation means comprises an element having a coefficient of thermal expansion which is substantially less than said second coefficient of thermal expansion.

3. A machine as defined in claim 2 wherein said element of said temperature compensation means as a coefficient of thermal expansion which is about zero.

4. A machine as defined in claim 1 wherein said temperature compensation means comprises an element of selected length and having a coefficient of thermal expansion which is substantially greater than said second coefficient of thermal expansion.

5. A machine for measuring a coordinate in a Z-direction of a point on a workpiece comprising:
    a machine base;
    a worktable for supporting the workpiece, said worktable having a first coefficient of thermal expansion and being mounted on said machine base;
    a Z-rail movable in the Z-direction relative to the workpiece including a probe for contacting the point on the workpiece;
    a support column resting on said machine base for supporting said Z-rail, said support column having a second coefficient of thermal expansion which is greater than said first coefficient of thermal expansion;
    means for sensing the position of said Z-rail relative to said column along said Z-direction, said sensing means having an associated Z-rail zero position; and
    fixed temperature compensation means associated with said column for automatically equalizing the expansion and contraction of said worktable and said column with temperature changes, said temperature compensation means comprising an element composed of a material having a coefficient of thermal expansion which is substantially less than said second coefficient of thermal expansion.

6. A machine as defined in claim 5 wherein said sensing means comprises a scale and an encoder, said scale being mounted into said Z-rail and said encoder being mounted onto means associated with said column for supporting said Z-rail.

7. A machine as defined in claim 6 wherein said element comprises a second column extending upwardly from said supporting means for said Z-rail in said Z-direction and to which said encoder is attached.

8. A machine as defined in claim 7 wherein said second column is composed of said material having a coefficient of thermal expansion substantially less than said second coefficient of thermal expansion.

9. A machine as defined in claim 8 wherein the coefficient of thermal expansion of said material composing said second column is about zero.

10. A machine as defined in claim 7 wherein said encoder is attached to a lower distal end of a rod, said rod being connected at an opposite, upper end to an upper end of said second column.

11. A machine for measuring a coordinate in a Z-direction of a point on a workpiece comprising:
    a machine base;
    a worktable for supporting the workpiece, said worktable having a first coefficient of thermal expansion and being mounted on said machine base;
    a Z-rail movable in a prescribed Z-direction relative to the workpiece and including a probe for contacting the point on the workpiece;
    a support column resting on said machine base for supporting said Z-rail, said support column having a second coefficient of thermal expansion greater than said first coefficient of thermal expansion;
    means for sensing the position of said Z-rail relative to said column along said prescribed Z-direction, said sensing means comprising:
        a second column extending in said prescribed Z-direction and mounted on a housing supported by said support column, said second column being formed of a material having a coefficient of thermal expansion substantially less than said second coefficient of thermal expansion;
        a first arm extending from said second column toward said Z-rail;
        a second arm depending downwardly from said first arm in a direction generally parallel to said Z-rail;
        an encoder secured to said second arm and facing said Z-rail; and
        a scale disposed on said Z-rail in spaced, confronting relationship with said encoder;
        said second column having a predetermined length such that the relative position of said encoder and said scale remains unchanged for a fixed position of said Z-rail over a range of temperatures.

12. A machine as defined in claim 11 wherein said column is formed of a material having a coefficient of thermal expansion which is about zero.

13. A machine for measuring a coordinate in a Z-direction of a point on a workpiece comprising:
    a machine base;

a worktable for supporting the workpiece, said worktable having a first coefficient of thermal expansion and being mounted on said machine base;

a Z-rail movable in a prescribed Z-direction relative to the workpiece and including a probe for contacting the point on the workpiece;

a support column resting on said machine base for supporting said Z-rail, said support column having a second coefficient of thermal expansion greater than said first coefficient of thermal expansion:

means for sensing the position of said Z-rail relative to said column along said prescribed direction, said sensing means comprising:

a support arm mounted on said column and extending in a direction generally toward said Z-rail;

a second arm depending from said support arm and extending in a direction generally parallel to said Z-rail, said second arm being composed of a material which has a coefficient of thermal expansion substantially greater than said second coefficient of thermal expansion;

encoder secured to said rod in spaced confronting relationship with a surface of said Z-rail; and a scale secured to said surface of said Z-rail in spaced, confronting, relationship with said encoder;

said second arm having a predetermined length for equalizing the expansion and contraction of said worktable and said column so that the relative position of said encoder and said scale remains fixed for a predetermined position of said Z-rail over a range of temperatures.

14. A machine comprising:

a first component having a first coefficient of thermal expansion;

a second component having a second coefficient of thermal expansion, said second component having a portion thereof which is movable relative to said first component;

means for sensing the position of said portion of said second component in a prescribed direction, said sensing means having an associated zero position; and fixed temperature compensation means associated with said second component for automatically equalizing the expansion and contraction of said first component and said second component with temperature changes, said temperature compensation means comprising an element of selected length and of a selected coefficient of thermal expansion, said selected coefficient of thermal expansion being substantially different from the greater of said first and said second coefficients of thermal expansion.

15. A machine as defined in claim 14 wherein said sensing means comprises a scale and an encoder mounted said second component.

16. A machine as defined in claim 14 wherein said second coefficient of thermal expansion is greater than said first coefficient of thermal expansion and wherein said selected coefficient of thermal expansion of said element of said temperature compensation means is substantially less than said second coefficient of thermal expansion.

17. A machine as defined in claim 16 wherein said selected coefficient of thermal expansion is about zero.

18. A machine as recited in claim 14 wherein said second coefficient of thermal expansion is greater than said first coefficient of thermal expansion, and wherein said selected coefficient of thermal expansion of said element of said temperature compensation means is substantially greater than said second coefficient of thermal expansion.

* * * * *